United States Patent

[11] 3,524,398

| [72] | Inventor | John C. Winfrey |
| --- | --- | --- |
| | | 320 S. Exposition, Wichita, Kansas 67213 |
| [21] | Appl. No. | 737,563 |
| [22] | Filed | June 17, 1968 |
| [45] | Patented | Aug. 18, 1970 |

[54] AIR CONDITIONING SYSTEM FOR VEHICLE OPERATOR ENCLOSURE
8 Claims, 8 Drawing Figs.

[52] U.S. Cl. ..................................... 98/17,
165/42, 165/60, 261/30, 261/98
[51] Int. Cl. ......................................... B01d 47/00
[50] Field of Search .......................... 165/3, 19, 20, 42, 60, 23; 261/98, 106, 30; 48/17

[56] References Cited
UNITED STATES PATENTS

| 2,189,391 | 2/1940 | Bowdish ...................... | 165/42 |
| 2,685,434 | 8/1954 | Underwood.................. | 165/19 |
| 2,769,620 | 11/1956 | Davison........................ | 165/60 |
| 3,042,383 | 7/1962 | Pennington .................. | 165/20 |

*Primary Examiner*— Robert A. O'Leary
*Assistant Examiner*— Charles Sukalo
*Attorney*— Robert E. Breidenthal

ABSTRACT: An air conditioning system for a vehicle operator enclosure (as for example, operator's cabs of truck tractors, agricultural implements and heavy construction equipment such as combines, tractors, harvesters, bulldozers, land levelers, etc.) that will introduce into the enclosure at a superatmospheric pressure air ambient to a location above the enclosure after such air has been filtered and selectively either cooled or heated. The system includes a low profile housing mounted on the top of the operator's enclosure with a passageway (partially defined by an opening in the top of the enclosure) established directly therebetween. Air impelling means are disposed in the housing for forcing air from within the housing through the passageway into the operator's enclosure, with ambient air being thereby drawn into the housing through air inlet openings provided in upstanding sides of the housing. Water wettable air filtering means is provided in the air inlet openings, with means being provided to maintain the filtering means wetted and at least partially cleaned by flowing water downwardly thereover (the rate of water flow being sufficiently low that the water is permitted to cool significantly with respect to the wet bulb temperature of the air passing therethrough, but preferably sufficiently great that the drainage will carry a significant amount of particulate foreign matter therefrom). The last mentioned means includes a water supply tank mounted on the enclosure at a position substantially below the top of the enclosure for receiving through a conduit water draining from the filtering means and for supplying water to the filtering means through another conduit and pump. A water filter is provided in one of the conduits to prevent foreign matter draining with water from the filtering means from being returned to the filtering means. The evaporative cooling effect can be interrupted by interrupting pump operation. A liquid-air heat exchanger is disposed in the passageway, such exchanger being connectible to the liquid coolant circulation system of the vehicle internal combustion engine so that hot liquid coolant from the engine block passes through the heat exchanger during its passage to the conventional cooling radiator. The housing has a pivotally connected top portion which can be unlatched from a lowered position of use, and pivotally swung upwardly to a raised position enabling access to the interior of the housing for maintenance or repair purposes and to enable removal and replacement of the filtering means.

Patented Aug. 18, 1970

INVENTOR.
JOHN C. WINFREY
BY
Robert E. Breidenthal
ATTORNEY

INVENTOR.
JOHN C. WINFREY
BY
Robert E Breidenthal
ATTORNEY

AIR CONDITIONING SYSTEM FOR VEHICLE OPERATOR ENCLOSURE

The present invention pertains to new and useful improvements in air conditioning apparatus for vehicle operator enclosures or cabs of the type provided with trucks or which may be installed on agricultural implements or heavy construction equipment such as combines, tractors, harvesters, bulldozers and land levelers, such air conditioning comprising the introduction of air that is filtered and selectively either cooled or heated. More particularly, the present invention pertains to an air conditioning system wherein the same is mounted on the top of the vehicle operator's enclosure with selective cooling effect obtained by the evaporation of water into the air being filtered, and the selective heating effect being obtained from heat exchange with the liquid coolant of the vehicle engine.

An important object of the invention is to provide an air conditioning system for use in conjunction with conventional vehicle operator's enclosures or cabs that will afford adequate filtering and temperature modification (heating or cooling) capacity that can be placed in position atop the enclosure and which in such position will not preclude movement of the vehicle on public roads because of excessive overall vehicle height.

Another important object of the invention is to provide a system of the type specified above which is of the water evaporative cooling type, and which has a substantial storage capacity for water so as to not require frequent addition of water to the system, and which can when necessary be readily and conveniently resupplied with water.

Yet another important object of the invention is to provide a system as described above that will have a substantial water capacity without necessitating any increase in the overall height of the vehicle in order to obtain such storage capacity, and which will not be such as to entail water spillage or losses on substantial tilting of the vehicle as when operated on rough or sloping ground surfaces.

It is still another important object of the invention to provide a system such as described above wherein a filtering means is kept not only thoroughly wetted to accomplish both effective air filtering and evaporative cooling, but also to effect a significant degree of cleaning of the filter by movement of water over the filter.

Yet another important object of the invention is to provide a system such as described above that will enable recovery for reuse, upon filtering, of water draining from the filter as a result of the wetting and cleaning thereof mentioned in the preceding paragraph.

Yet another important object of the invention is to provide a system such in the performance of its heating function will employ the same air filter and air impelling means as are employed during the cooling function, and which will utilize as a source of heat the heat of engine coolant liquid.

It is also an important object of the invention to provide a system such as described above wherein the system draws thereinto, for filtering and selective either heating or cooling, air ambient to a location or zone disposed above the operator's enclosure so as to minimize the induction of entrained dust, entrained vegetable fiber fragments, noxious fumes, mists and the like.

Still another important object of the invention is to provide a system such as described above that will be easy to repair whenever necessary and which will also be susceptible to ready replacement of exhausted parts. A final important object of the invention to be specifically mentioned is to provide a system of the character defined above that will be reliable in operation, durable, simple and economical in both construction and operation and which will be attractive in styling and appearance.

A broad aspect of the invention involves the combination of a vehicle operator's cab and an evaporative air conditioner therefor that includes a housing externally mounted on the top of the cab with such housing including air inlet means provided with a water wettable air filter therein and enclosing an air impelling means for drawing ambient air into the housing through the air filter and exhausting filtered air through an outlet communicating with the interior of the cab through the top of the latter; the improvement comprising a water circulation means for continuously wetting and washing the air filter with water, said water circulation means comprising a water supply tank positioned at a height substantially lower than the housing, a first conduit means including a first conduit provided with a pump therein for forcing delivery of water from the tank onto the top of the air filter, and a second conduit means communicating with the interior of the housing for returning water draining from the air filter by gravitational flow to the tank. This aspect of the invention optionally but preferably includes the provision of a water filter in one of the conduits.

Still another aspect of the invention involves a self-propelled vehicle of the type that includes an operator's enclosure that is less than airtight and an internal combustion prime mover having a liquid coolant system; the combination therewith of air conditioning means for introducing into the enclosure air ambient to space above the enclosure after filtering and heating such air, said air conditioning means comprising a housing mounted on the top of the operator's enclosure and defining a chamber therein, said housing having air inlet means affording communication between the chamber and air ambient to the housing, air filtering means in said inlet means, said housing having an outlet means affording communication between the chamber and the interior of the enclosure, heat exchanger means in the outlet means for heating air passing therethrough when relatively warm coolant liquid is circulated through such means, means for circulating the liquid coolant through the heat exchanger means, and means for urging flow of air from the chamber through the outlet means and the heat exchanger means, whereby air above the enclosure and ambient to the housing is drawn through the filtering means into the chamber with the latter being at a subatmospheric pressure, and the resulting cleaned air is forced into the enclosure with such air being heated during such passage, and whereby the air pressure of the enclosure is maintained at a superatmospheric pressure to prevent entry of ambient air into the enclosure except through the outlet means.

A broad aspect of the invention involves in an evaporative cooler for introducing fresh, filtered and cooled air into a vented enclosure, the improvement comprising a housing having an air inlet means, a vertically extending water wettable air filter in said inlet, a passageway communicating between the interiors of the housing and the enclosure, impeller means for causing movement of air from within the housing into the passageway in an arrangement such that ambient air is drawn into the housing through the air inlet and the filter disposed therein and is then moved from within the housing to the interior of the enclosure through the passageway with air in the vented enclosure being displaced from within the enclosure by air entering by way of the passageway, the pressures prevailing within the housing and within the enclosure being respectively below and above ambient air pressure to an extent determined by pressure drops suffered by air during its entry into the housing and during its displacement from the vented enclosure, a water supply vessel and a first conduit means having one end connected thereto for directing and discharging water upon the top of the filter, a second conduit means connected between the vessel and the housing with the latter connection being at a height below the bottom of the filter, said water supply vessel being disposed at a height sufficiently below said latter connection of the second conduit means whereby water can gravitationally flow from within the housing to the vessel, and a water pump disposed in one of said conduit means.

Still another aspect of the invention involves a self-propelled vehicle of the type including a vehicle operator's enclosure that is less than airtight and an internal combustion prime mover having a circulating liquid coolant; the combination therewith of a single air conditioning means for introducing into the enclosure filtered ambient air that has been selectively warmed by heat exchange with the liquid coolant liquid system or evaporatively cooled to an extent limited by the wet bulb temperature thereof, said air conditioning means comprising a housing mounted on the exterior of the operator's enclosure and defining a chamber therein, said housing having air inlet means affording communication between ambient air and the chamber, air filtering means in said inlet means, means selectively operable to maintain the filtering means wetted with water whereby unsaturated ambient air entering the chamber through the water wetted filtering means in the inlet means is cooled to an extent limited by the wet bulb temperature of the ambient air, said housing having an outlet means affording communication between the chamber and the interior of the enclosure, heat exchanger means in the outlet means for heating air passing therethrough when relatively warmer coolant liquid is circulated through such means, means for selectively circulating the liquid coolant through the heat exchanger means, and means for urging flow of air from the chamber through the outlet means and the heat exchanger means, whereby ambient air is drawn through the filtering means into the chamber with the latter being at a subatmospheric pressure, and the resulting cleaned air being forced into the enclosure with such air being selectively cooled or heated during such passage, and whereby the air pressure of the enclosure is maintained at a superatmospheric pressure to prevent entry of ambient air into the enclosure except through the outlet means.

Still another aspect of the invention involves the housing described above being generally rectangular and including a rectangular bottom portion having a bottom wall and an upstanding fixed first end wall at one end thereof constituting a first end wall of the housing, and a top portion above and pivotally connected to the bottom portion, said top portion including a rectangular top wall spaced above the bottom wall and having depending walls at its opposite sides and at one end thereof, said depending walls of the top portion constituting in part side walls of the housing and the depending wall at one end of the top portion constituting in part a second end wall of the housing that is disposed at the end of the latter opposite the first end wall, said depending walls of the housing top portion having openings therethrough constituting said air inlet means, said air filter being generally U-shaped and including upstanding opposite side portions and an upstanding end portion extending therebetween, said air filter being within the housing and carried by the bottom portion of the housing with the end portion thereof being closely juxtaposed to the second end wall of the housing and the side portions thereof being closely juxtaposed to the depending side walls of the housing top portion, said bottom wall of the housing having an upstanding second end and side walls respectively constituting in part said second end wall and said side walls of the housing, said top portion of the housing being pivotally movable about a horizontal axis between a horizontal position of use and a raised position affording access to the interior of the housing, said axis being parallel to and adjacent to the second end wall of the housing, and said top and bottom portions of the housing being in substantial sealing relationship with each other along the lower edges of the depending walls and along the top and lateral edges of the first end wall of the housing, when the top portion is in its position of use.

An important feature of the invention resides in the bulk of the entire water storage capacity of the air conditioning system being in the form of a water supply tank or vessel mounted on the operator's enclosure or the vehicle carrying the same at a position substantially below the top of the operator's enclosure whereby the dimensions of the housing on top of the operator's enclosure do not have to be increased to obtain greater water storage capacity, and whereby any possibility of water spillage through the air inlets is at least greatly minimized despite the fact that the housing has a low profile and that the air inlets are spaced only a short interval above the top of the operator's enclosure. Still another feature of importance resides in the pivotal mounting of the top portion of the housing whereby the top portion may be swung upwardly to afford access to the interior of the housing and in order to greatly facilitate whenever necessary removal of exhausted air filter sections.

Still another important feature of the invention resides in the provision of means whereby water can be supplied to the filter at a rate in excess of the rate of evaporative losses of water, whereby the excessive water flow serves to flush or partially wash clean the filter, with the water draining from the filter being recovered, filtered, and recirculated to the top of the filter.

Yet another feature of the invention resides in the capability of concurrently wetting or humidifying and heating air so as to avoid the relative humidity of the air entering the operator's cab from becoming excessively low.

These and other objects, aspects, features and advantages of the invention will clearly manifest themselves during the ensuing description of a preferred embodiment of the invention, such description to be taken in conjunction with accompanying drawings illustrative of such embodiment of the invention, wherein:

Referring now to the drawings wherein like numerals designate like parts throughout the various views, the reference numeral 10 designates generally a self-propelled vehicle, specifically a tractor of the farming type that is equipped with the air conditioning system of the subject invention designated generally at 12.

The conventional vehicle 10 is of the self-propelled type that includes preferably insofar as the subsequently to be described means for effecting heating of air is concerned a conventional prime mover 14 of the type known as an internal combustion engine (either diesel or electrical ignition character) that includes a circulating liquid coolant system, not shown. Inasmuch as internal combustion engines inclusive of liquid coolant systems are well known in the art, no useful purpose is seen to be served by illustrating or describing the conventional liquid coolant system as including a circulatory system wherein heated coolant liquid is conducted from the engine block radiator (air-liquid heat exchanger) for being cooled prior to return to the engine block. Illustration and description of such well known apparatus would only tend to obscure the actual inventive content of this specification. The conventional self-propelled vehicle 10 also conventionally includes a conventional vehicle operator's enclosure or cab 16 having a top wall 18. The cab 16 can, as mentioned above, be such as to be an integral component of the vehicle 10 as the latter is manufactured and sold on the market, or the cab 16 can be an auxiliary attachment or accessory subsequently added to the vehicle 10 by the owner thereof, it being noted that many extant vehicles were manufactured and sold initially without any protection for the driver or operator from the elements, and that many manufacturers now market cabs or operator enclosures suitable for modification of extant vehicles to afford protection of the operator against the elements.

Inasmuch as operator enclosures or cabs suitable for use in connection with the present invention are also well known, no useful purpose will be served by elaborately describing or illustrating such conventional units other than to the extent set forth in detail hereinafter in this specification. Suffice to say, as is well known, conventional operator enclosures include an access door and windows whereby the operator can get into and out of the enclosure as well as have an adequate field of view when operating the vehicle. It is also well known to those familiar with conventional operator enclosures or cabs that such are not airtight by virtue of the absence of perfect sealing around access doors, unused mounting holes, etc. to the end effect that the enclosure 16 may be considered to be a vented enclosure. In any event it is to be understood that the enclosure 16 is not airtight, but does have a limited degree of venting such as occasioned by imperfect door seals, unused mounting holes, and the like, with it to be understood in the unlikely event that the conventional enclosure 16 is airtight or nearly so, that openings can be made therein of sufficient cross section to realize certain functions that will be subsequently spelled out in detail.

While the form of vehicle 10 illustrated in the drawings is in the nature of an agricultural tractor, it is to be expressly understood that such particular form of vehicle is merely exemplary of a number of different types of self-propelled vehicles with respect to which the principles of the present invention are applicable. The vehicle 10 can be any one of a number of different types of self-propelled vehicles such as agricultural implements and heavy construction equipment, as by way of examples, combines, harvesters, bulldozers, land levelers, etc.

Though there may be some exceptions, it is usually the case that the highest portion of the vehicle 10 and the operator enclosure 16 combination is the top wall 18 of the enclosure 16. As will be seen presently, the present invention is benefited by the height of the top wall 18 of the enclosure 16.

Everything thus far described, except for the air conditioning system 12, is entirely conventional and does not in and of itself constitute any inventive subject matter per se of this invention.

Attention is now directed to the air conditioning system 12 constituting the subject matter of the present invention either taken alone as well as in combination with the conventional vehicle 10 and operator enclosure 16 discussed above. The air conditioning system 12 is comprised of a housing mounted securely on the top wall 18 of the cab 16, such housing being designated generally at 20. The housing 20 includes a bottom portion 22 (see FIGURE 3) and a top portion 24. The bottom portion 22 has a bottom wall 26 generally conformable to the contour of the upper surface of the top wall 18 of the cab 16. Inasmuch as most conventional operator cabs have a planar top wall 18, the bottom wall 22 of the housing 20 is flat. The housing 20 has a generally rectangular configuration in the horizontal dimensions thereof, and the bottom wall 26 is provided with upstanding front and rear walls 28 and 30, the rear wall 30 having an upper edge 32 that terminates at a greater position of height than the upper edge 34 of the front wall 28. It should be noted at this point that the housing 20 is hereinafter described insofar as the positions of height of various components thereof as though the bottom wall 26 is disposed horizontally when the vehicle 10 is resting upon horizontal terrain. In the light of ensuing descriptions of the function of the air conditioner 12, it is deemed well within the skill of those having modest familiarity with the art to adjust relative dimensions of components of the housing 20 to accommodate the housing 20 to operator cabs 16 having vertically inclined top walls 18 when the vehicle 10 is resting upon level ground. Accordingly, assuming the bottom wall 26 to be in the horizontal plane, the rear wall 30 is simply taller or rises to a relatively greater extent above the bottom wall 26 than the front wall 28.

The bottom wall 26 is also provided with upstanding walls 36 and 38 having heights that progressively diminish from their junctures with the front wall 28 to their junctures with the rear wall 30. Laterally projecting ears such as those indicated at 40 and 42 in relation to the side wall 36 are fixed to both of the side walls 36 and 38, and such laterally projecting ears 40 and 42 are in turn rigidly attached to the top wall 18 of the enclosure 16 by means of welding or nuts and bolts, not shown, whereby the housing 20 effectively becomes or constitutes an integral part of the operator cab 16.

The upper marginal edge portions of the side walls 36 and 38 are inturned towards each other to define inclined seats such as indicated at 44 and 46, respectively, and are thence upturned to define upstanding edge portions 48 and 50. As will be seen presently, the seats 44 and 46 are for the purpose of supporting the lower edges of side walls carried by the top portion of the housing 20. Also as will be presently seen, the upstanding edge portions 48 and 50 will partially define side channels or troughs for removably accommodating and supporting lower edge portions of filter panels or sections. Except as hereinafter indicated, the housing 20 is formed or fabricated of sheet steel of adequate gauge for strength, whereby various parts thereof can be readily fabricated from widely available stocks. If desired, the sheet steel constituting the various parts of the housing 20 can be clad or plated with any conventional and suitable corrosion resistance material such as zinc or the like.

A channel or trough defining structure designated generally at 52 (see FIGURE 3) is provided, the structure 52 being formed of the same character of materials as previously mentioned in connection with the housing 20. The structure 52 is generally U-shaped and comprises a web or front end portion 54 having its opposite ends connected to the forward ends of parallel side portions 56 and 58. The web portion 54 includes in transverse section a flat horizontal intermediate extent 60 provided with depending and upstanding flanges 62 and 64 respectively at its forward and rear edges.

The side portions 56 and 58 of the structure 52 are symmetrical with respect to an intervening vertical plane, and as best shown in connection with the side portion 58, the latter is comprised of a horizontal portion 66 having an upstanding flange along the edge thereof nearest the other side portion 56, such flange being indicated at 68. The upstanding flanges 68 of the side portions 56 and 58 are contiguous to and connected to the upstanding flange 64 of the web portion 54.

The structure 54 is disposed intermediate the side walls 36 and 38 of the lower portion 20 of the housing with the depending flange 62 being seated against and secured by any suitable means such as spot welding (not shown) to the inner face of the front wall 28 at a position spaced below the upper edge 34 thereof, the arrangement being such that the portion of the wall 28 above the intermediate portion 60 defines jointly with the intermediate portion 60 and the upstanding flange 64 an upwardly facing channel or trough for receiving as will be presently described a lower edge portion of a filter section. Also for reasons to become apparent shortly, the structure 60 is provided with a series of drain openings 67 so that water in the trough partially constituted of the structure 60 can drain therethrough.

The outer edges of the portions 66 are disposed below and are fixed to the undersides of the parts of the side walls 36 and 38 defining the seats 44 and 46 by any suitable means such as spot welding (not shown). It is to be understood that the side portions 56 and 58 have the same rearward and downward slope as the upper edge portions of the respective side walls 38 and 36. The transverse extents of the portions 66 are such that the upstanding flanges 68 thereof are inwardly spaced from the respective upstanding edge portions 48 and 50 of the side walls 36 and 38, the arrangement being such that upwardly facing channels or troughs are defined for receiving the lower edges of filter sections as will be presently explained. These troughs have drain openings 69 in the bottoms thereof. It will be noted with respect to such channels that they slope downwardly and rearwardly in the same manner as do the upper edges of the side walls 36 and 38. The transversely extending channel partially defined by the web portion 54 of the structure 52 and the parallel longitudinally extending channels respectively defined in part by the side portions 56 and 58 are substantially in the form of a single U-shaped channel.

Figure 1:
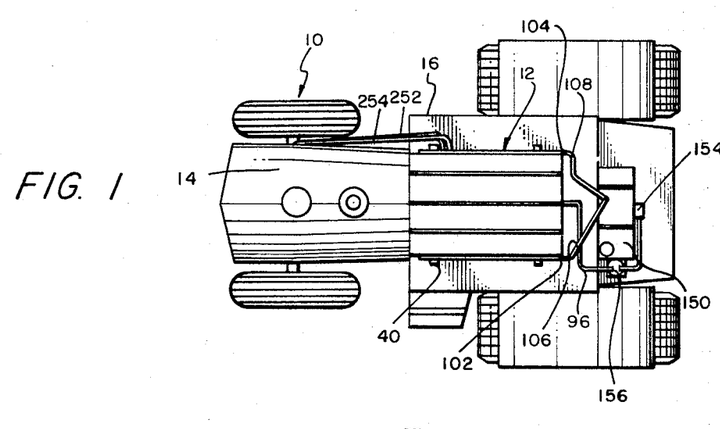
FIGURE 1 is a top plan view of the invention shown as applied to a tractor partially shown in dashed outline.
Figure 3:
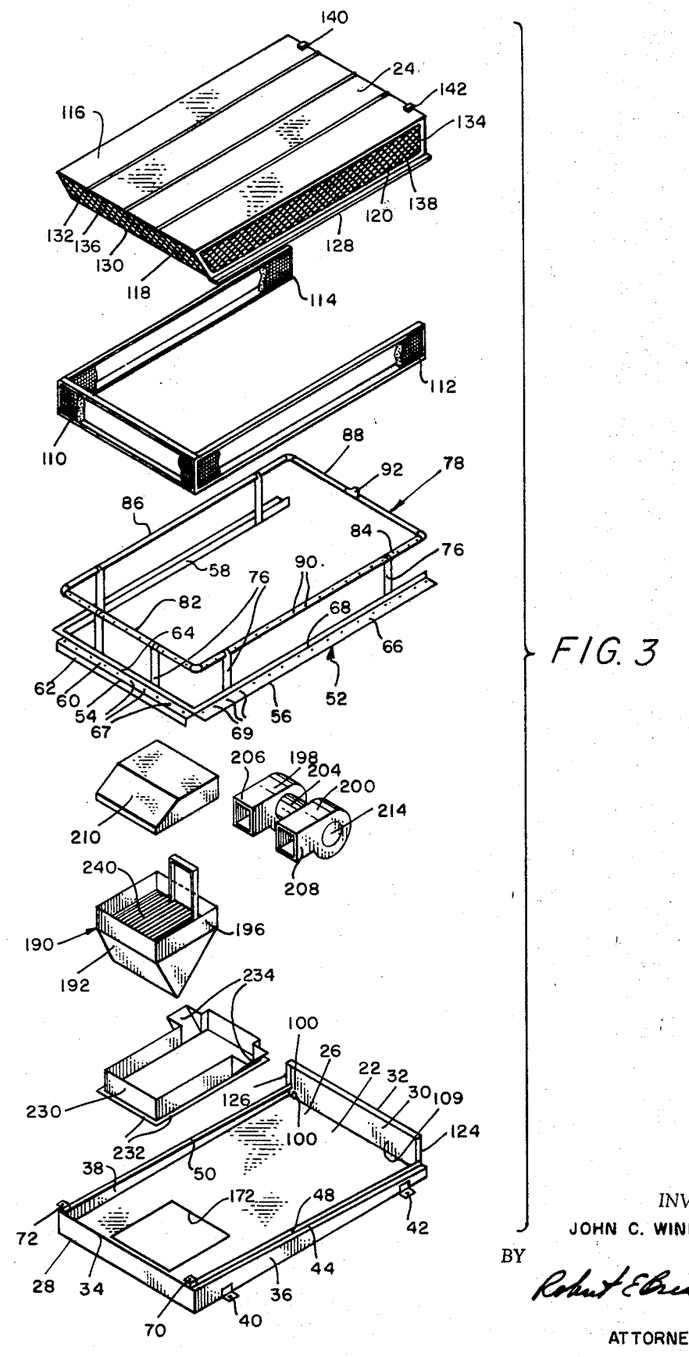
FIGURE 3 is an exploded isometric view of the housing and components of the air conditioning system disposed within the housing.

As shown in FIGURE 3, a set of upstanding straps 76 are secured to the upstanding flanges 64 and 68 of the structure 52, and the upper ends of the straps 76 are suitably secured to a rectangularly shaped fluid conduit designated generally at 78. The rectangular conduit 78 is disposed in a plane approximately parallel to a plane defined by the upper edges of the side walls 36 and 38. The rectangular conduit 78 includes a forward transverse extent 82, side extents 84 and 86, and a rear transverse extent 88. The forwardmost edge of the transverse extent 82 is substantially in the same vertical plane as the upstanding flange 64 of the structure 52 with the corresponding edges of the longitudinal extents 84 and 86 terminating substantially in the vertical planes of the upstanding flanges of the side portions 56 and 58 of the structure 52. For a purpose presently to be explained, the transverse extent 62 as well as the longitudinal extents 84 and 86 of the rectangular conduit 78 are perforated by small openings such as indicated at 90. The rear transverse extent 88 of the rectangular conduit 78 is provided at a central position with a T-fitting 92 for sealing connection through the rear wall 30 of the housing 20 to a water supply conduit 96 (see FIGURE 1).

The rear wall 30 is provided at its lower edge portion with laterally spaced drain openings 100, and such drain ports or openings 100 are provided with suitable coupling means 102 and 104 sealing affording communication through the rear wall 30 between the lowermost interior portion of the housing 20 and a pair of water conduits 106 and 108 that extend downwardly therefrom. The lowermost interior portion of the housing is designated at 109, is disposed below the previously described U-shaped trough or channel, and constitutes a water collecting chamber for water draining from the air filter means now to be described.

The upwardly facing transverse channel or trough partially defined by the web portion 54 of the structure 52 receives the lowermost edge portion of an upright, generally rectangular water wettable air filter section or panel 110. In a similar manner, the side channels respectively partially defined by the side portions 56 and 58 of the structure 52 receive the lower edge margins of upstanding substantially rectangular, water wettable air filter sections or panels 112 and 114. It will be understood that although the air filter panels 110, 112 and 114 jointly define a generally U-shaped air filter, the panels 110, 112 and 114 are separate and can each independently be inserted into and vertically removed from their respective supporting channels. It will be appreciated that the arrangement is such that water emerging through the perforations 90 in the conduit extent 82 will be directed to flow into and onto the upper marginal portion of the water wettable filtering material of the panel 110 so that water will wet the entire filter panel 110, and with water draining from such panel 110 being received in the collecting chamber 109. Similarly, the conduit extent 86 wets the upper marginal portion of the filter section or panel 114 with excess water draining therefrom passing into the collecting chamber 109. In an entirely analogous manner, the conduit extent 84 wets the filter panel 112 with excess water draining into the collecting chamber 109. Water entering the U-shaped channel or trough partially defined by the structure 52 will drain therethrough (by reason of the openings 67 and 69) into the collecting chamber 109 and thence pass into the water conduits 106 and 108.

The top portion 24 of the housing 20 is of sheet steel and is comprised of a generally rectangular top wall 116 having a depending front wall 118 and depending side wall 120 and 122. The top wall 116 is approximately parallel to upwardly sloping U-shaped trough. The rear marginal edges of the top wall 24 and the side walls 122 and 124 respectively seat against and have small operating clearance with the upper edge 32 of the rear wall 30 and its opposite edges 124 and 126 respectively.

The lower edges 128 of the depending side walls 120 and 122 respectively seat on the previously described seats 44 and 46 of the lower portion 22 of the housing 20. The lower edge 130 of the depending front wall 118 terminates in close proximity to the upper marginal edge 34 of the wall 28 of the lower housing portion 22. As clearly shown the depending walls 118, 120 and 122 of the top portion 24 have openings therethrough such as those indicated at 132 and 134 so as to constitute air inlet means for the housing 20, and preferably such openings 132 and 134 are provided with protective metal screens or grids such as indicated at 136 and 138. The depending walls 118, 120 and 122 can be comprised, if desired or deemed expedient, of expanded sheet steel, in whole or in part. Preferably, the top wall 116 of the top housing portion 24 seats against the upper edges of the filter sections 110, 112 and 114, the arrangement being such that such filter sections are effectively retained in or closely juxtaposed to such air inlet openings to result in all air entering the housing 20 through such air inlet openings being constrained to pass through one or the other of the filter sections or panels 110, 112 and 114. In the preferred construction, the filter sections 110, 112 and 114 are in close juxtaposition but spaced slightly from the depending walls 118, 120 and 122, respectively.

Figure 4:
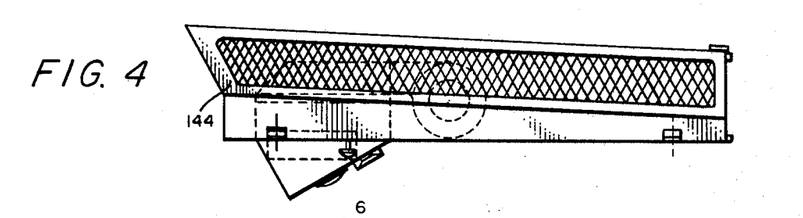
FIGURE 4 is a side elevational view of the housing with hidden internal structure being shown in dashed outline.
Figure 5:
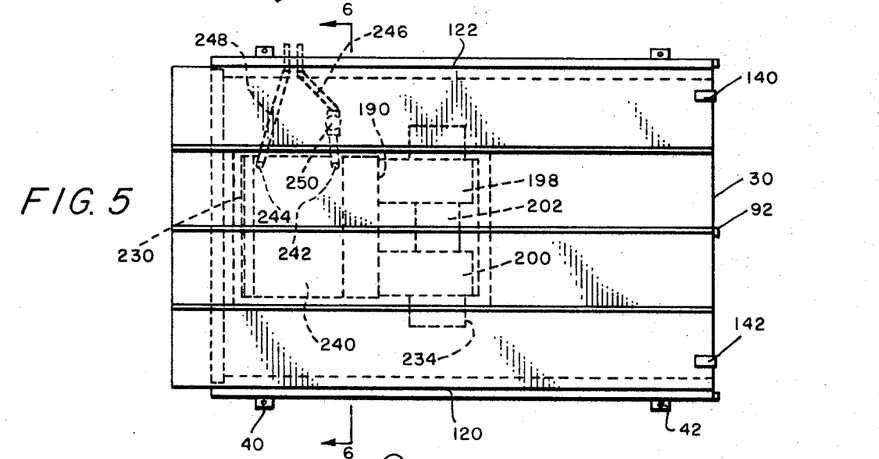
FIGURE 5 is a top plan view of the structure shown in FIGURE 4 with hidden parts being shown in dashed outline.
Figures 6, 7:
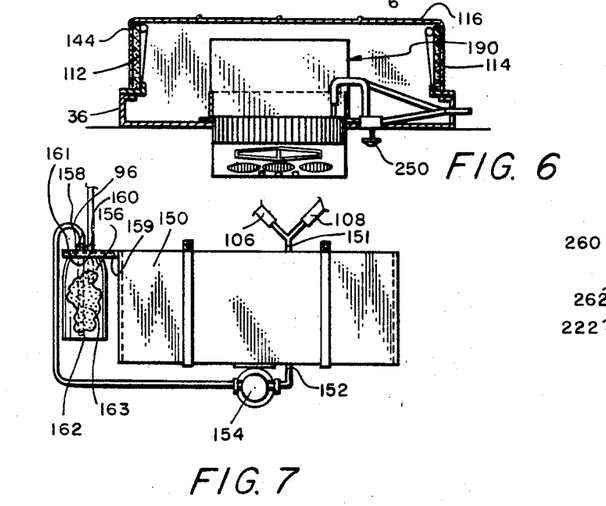
FIGURE 6 is a transverse vertical sectional view taken upon the plane of the section line 6-6 in FIGURE 5.
FIGURE 7 is a rear elevational view of the water storage tank and conduits connected thereto and the water pump and water filter associated with such conduits, a portion of the water filter being broken away to show the interior of the same.
Figure 8:
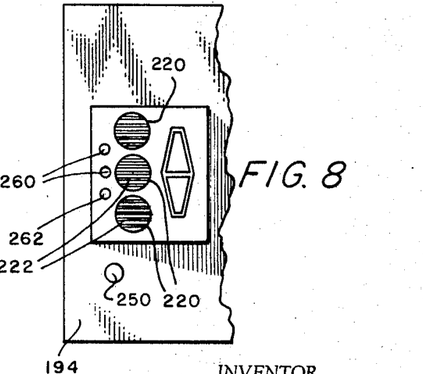
FIGURE 8 is an enlarged, broken view taken in an upwardly and forwardly direction from within the operator's enclosure face on to the control panel and discharge openings of the air conditioner.

As thus described, it will be seen that the upper housing portion 24 is supported upon the lower housing portion 22 by virtue of the lower edges of the depending side walls 120 and 122 resting upon the vertically inclined seats 44 and 46. The top portion of the housing 22 is releasably retained in the described position by means of conventional latches partially shown at 140 and 142 on the top wall 116 of the top portion 124 that coact with structure, not shown, on the rear wall 30 for releasably securing such walls together. The latch structures 140 and 142 are, as mentioned, conventional and do not require detailed illustration and description for a full and complete understanding of the invention. The forward lower edge portions of the side walls 120 and 122 are pivotally connected to the lower housing portion 22 by means of pivot pins such as indicated as 144 in FIGURE 4, whereby the top housing portion 24 is swingable about a transversely extending horizontal axis defined by the pivot pins 144 from the full line position shown thereof in FIGURE 2 to the raised position shown thereof in dashed outline in FIGURE 2. It will be understood that whenever desired the top housing portion 24 can be swung to the dashed position thereof upon release of the latches 140 and 142. When the top housing portion 24 is swung to the dashed position shown thereof in FIGURE 2, it will be appreciated that the entire interior of the housing 20 is accessible, and the filter sections 110, 112 and 114 can be conveniently removed for replacement, repair, or reconditioning as may be required.

Figure 2:
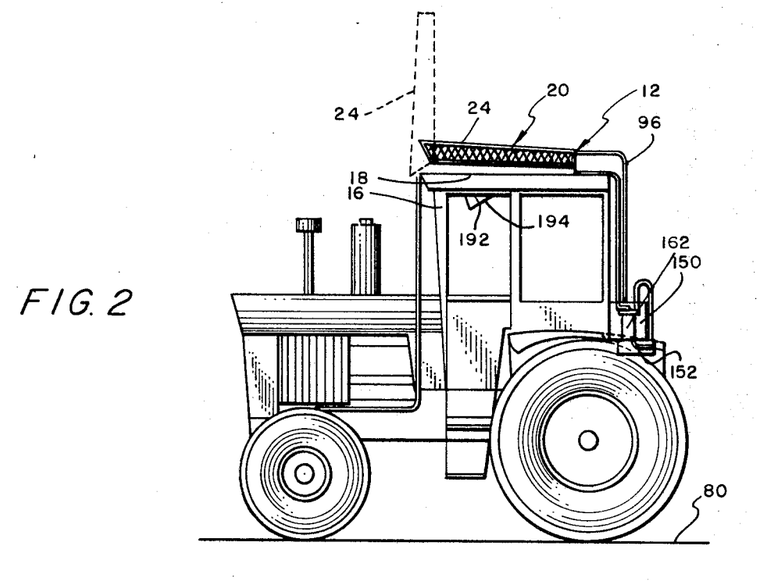
FIGURE 2 is a side elevational view of the apparatus shown in FIGURE 1, with an alternative position occupied by the top portion of the housing being shown in dashed outline.

The top housing portion 24 has a center of gravity such that when the same is disposed in the dashed position shown thereof in FIGURE 2, the center of gravity is disposed forwardly of the pivotal axis defined by the pivot pins 144 so that barring any effects of excessive wind, the top housing portion 24 will have no tendency to pivot back to the position shown thereof in full lines in FIGURE 2. The illustrated relationship between the top housing portion 24 and the cab 16 is obviously such that the top housing portion 24 is denied further pivotal motion from the full line position shown thereof than that indicated in dashed outlines. In any event, the pivotal movement is limited to approximately 135° by engagement of the wall 118 with the wall 28. Such limitation on pivotal movement results from the depending front wall 118 of the housing top portion 22 being inclined upwardly and forwardly so as to engage with and constitute a stop against either the top wall 18 of the cab 16 or the wall 28.

A water storage tank or vessel 150 is carried on the vehicle 10, and can be conveniently mounted on the rear of the operator's cab 16 as shown, but in any event the water storage vessel 150 is mounted at a height substantially less than that of the filter sections 110, 112 and 114 for a reason presently to be explained. The previously mentioned water conduits 106 and 108 (preferably flexible rubber or plastic hoses—clear plastic being especially preferred so that proper flow can be visually ascertained) are connected to the top of the water tank or vessel 150 through a "Y"-fitting 151, as shown, the arrangement being such that water in the chamber 109 will gravitationally flow through the conduits 106 and 108 and into the tank 150. The previously mentioned water conduit 96 (also preferably flexible and transparent) is connected to the bottom of the tank by a suitable fitting as indicated at 152, with a conventional electrically driven water pump 154 being interposed in the conduit 96 so as to pump water from within the lower portion of the tank 50 through the conduit 96 to the previously described rectangular water conduit 78 for the purpose of wetting and flowing water over the filter panels 110, 112 and 114. The water pump 154 can be of the centrifugal type or of any other suitable type, and it will be understood that the electrical prime mover incorporated therein is energized from the direct current electrical supply (not shown) of the vehicle 10. An off-on switch therefor can be located on a control panel yet to be described.

Optionally, but highly preferably, the conduit or flexible hose 96 has incorporated therein (intermediate the pump and the "T" fitting 92) a conventional water filter 156 so as to extract an foreign particulate matter from the water that is flowed upon the air filter. The water filter is mounted preferably on one side of the tank 150 as shown for convenient visual as well as maintenance accessibility. As mentioned, the water filter 156 interposed in the conduit 96 is of conventional character but is preferably of the type wherein the same includes a cover or cap 158 in which both the inlet and outlet ports 160 and 161 thereof are disposed, such cover 158 being attached to the tank 150 by a bracket 159. A clear glass jar 162 has its upper end threadingly received in the cap 158, the arrangement being such that the inlet and outlet ports 160 and 161 respectively communicate with the lower and upper internal portions of the jar 162. A filter material 163 is disposed in the jar 162 to filter out or prevent upward movement of foreign matter that might be otherwise entrained by upward water movement. Such conventional form of filter 156 is preferred for the reason that visual inspection thereof will indicate when the cleaning of the filter is necessary, and also for the reason that such filter can be easily cleaned by unscrewing the jar 162 from the cover 158 and removing or flushing foreign matter from the jar 162.

Means is provided for impelling the movement of air from within the housing 20 into the interior of the operator's cab 16. Openings 170 in registry with each other are provided through the bottom wall 26 of the bottom housing portion 22 and the top wall 18 of the operator's cab 16. A casing 190 is mounted upon and fixed to the bottom wall 26 by any suitable means, such casing 190 extending through the openings 172 and including a downwardly and rearwardly extending portion 192 that is disposed within the driver's cab 16. The lower end of the casing portion 192 is closed by a control panel 194 that is arranged to face toward the head of the operator (not shown) from a position higher and forward of the operator's head.

The casing 190 includes a portion 196 extending above the wall 26 and above the chamber 109. A pair of centrifugal fans 198 and 200 are provided which are disposed on the opposite sides of an electric motor 202 by means of which they are driven. Discharge ducts 206 and 208 of the fans 198 and 200 are arranged to discharge into the upper end of the casing portion 196, with the upper end of the casing 190 being closed by a casing cover 210. The air blower unit comprised of the fans 198 and 200, their housings including the ducts 206 and 208, and the electric motor are preferably fixedly but detachably secured to the wall 26 and the casing portion 196 by any suitable means (such as nuts and bolts, not shown), so that the same can be removed, if necessary, for repair or replacement. Similarly, the cover 210 is fixedly but preferably detachably secured to the casing portion 196 so that access can be had if necessary to the interior of the casing 190. It will be noted that a plate 212 is fixed to the casing 190 and received between the ducts 206 and 208 so that the connection of the blower unit to the casing 190 with the cover 210 thereon is air tight. Accordingly, air drawn into the oppositely facing inlets 214 of the fans 198 and 200 is forced into the upper end of the casing 190 to pass downwardly therethrough and be discharged therefrom through openings 220 in the panel 194. Preferably, the openings 220 are provided with conventional sets of rotatable and adjustable air deflecting and directing means 222. The electric motor 204 is connected by means not shown to be energized from the electric supply of the vehicle 10, as in the case of the pump 154, and may likewise be provided with an off-on switch on the panel 194.

Means is provided to prevent water in the collection chamber 109 from contacting the casing 190 or the blower unit. Such means comprises an endless upstanding rectangular wall 230 disposed to rest on the bottom wall 26 and to surround the casing 190 and the blower unit, the lower edge of the wall 230 having a continuous foot or outwardly directed flange 232 that is sealingly secured, as by a continuous bead or seam of welding, to the bottom wall 26. The opposite sides of the rectangular wall 230 include outwardly inclined portions to accommodate the inlets of the fans 198 and 200.

A rectangular liquid-air heat exchanger unit 240 is fitted and secured in the casing 190 in substantially the same plane as the bottom wall 26. The heat exchanger is such as to confine liquid circulating therethrough and to permit vertical passage of unconstrained air therethrough, and is generally analogous to the heat exchangers of liquid cooled automobile engines commonly referred to as radiators. The heat exchanger unit 240 has inlet and outlet ports 242 and 244 connected to pipes 246 and 248, respectively, that sealingly extend through intervening structure to the exterior of the housing, it being noted that a manual control valve 250 is provided in the conduit 242, whereby the rate of liquid flow into the unit 240 can be controlled and shut off entirely if desired. The conduits 242 and 244 are connected by flexible hot water hoses to liquid coolant system, not shown, of the engine 14 in such an arrangement that hot liquid, which is customarily water possibly including ethylene glycol or the like, exhausting from the block of the engine 14 is urged by the pump of the liquid cooling system to enter the hose 252 with the hose 254 exhausting to radiator of the liquid coolant system. The circuit including the hoses 252 and 254 may, if desired, be paralleled with a portion of the liquid coolant circuit across which a pressure differential exists for concurrent flow in each, whereby closure of the valve 250 will not result in loss of adequate cooling for the engine 14 as will be readily understood by those familiar with liquid coolant systems.

The panel 194 is provided with control knobs such as those indicated at 260 and 262 for actuating electric switches to control the operation of the electric powered components of the apparatus, such as the pump 154, the fan motor 204, etc.

The operation of the air conditioning system 12 when employed to introduce filtered and cooled air into the interior of the operator's cab 16 will be readily understood. The pump 154 is energized to pump water from the tank 150 through the conduit 96 to wet the filter sections 110, 112, and 114 by means of the rectangular or water distributor conduit 78, it being noted that such pumped water is freed of any entrained foreign matter by means of the water filter 156. The water pumping rate of the pump 154 is such that under normal conditions of relative humidity of the summer season, the amount of water flowed onto the filter sections is somewhat in excess of the rate at which water is evaporated from the filtered sections, with the result that a portion of the pumped water will wash over and tend to flush particulate solid foreign matter from the filter sections and to cause such removed foreign material to drain, at least in part, along with water back to the storage tank through the conduits 106 and 108. Such operation serves to assist materially in preventing or postponing the filter sections 110, 112 and 114 becoming sufficiently clogged with particulate foreign matter as to necessitate a special cleaning operation thereon.

It is to be noted that ambient air entering into the housing 20 will necessarily undergo at least some pressure drop from ambient air pressure on entering the housing 20 through the filters; however, such modest subatmospheric air pressure within the housing 20 will not preclude ready drainage by gravitational flow of the chamber 109 through the conduits 106 and 108 by virtue of the water tank 150 being disposed substantially below the housing 20.

It will be readily appreciated by those having any degree of familiarity with the art that the air entering the housing 20 through the water wetted filters 110, 112 and 114 will be cooled to a maximum extent limited only by the wet bulb temperature of the ambient air. Whereby the desired cooling effect is obtained. As mentioned previously the operator's cab 16 is or can be readily made to be somewhat less than air tight and essentially amounts to a vented enclosure, and this point is significant in that there will be some amount of air pressure drop on air being displaced therefrom to ambient atmosphere. The pressure in the cab 16 is therefore slightly superatmospheric. Obviously, the air impeller means produces an air pressure differential at least as great as the pressure drops to which the air is subjected on entering the housing 20 and on returning to ambient atmosphere from within the operator's cab 16. As the air pressure prevailing within the operator's cab 16 is at least slightly in excess of ambient atmospheric pressure, entry of air into the cab 16 by any other travel path than through the housing 20 is prevented.

When it is desired to employ the air conditioning system 12 for the purpose of heating air entering the cab 16 rather than cooling the same, as will be desired during cool weather, the pump 154 is de-energized (unless some degree of humidification is preferred), and the valve means 150 associated with the air-liquid heat exchanger 240 disposed intermediate the interiors of the housing 20 and the cab 16 is operated so as to cause liquid coolant traveling from the engine block to the radiator of the prime mover 14 to pass through such air heating exchange means. Ambient air is then caused to be filtered and then heated prior to entry into the cab 16. In the preferred construction, the pumping rate to the pump 154 is adjustable (as, for example, by the use of a variable rheostat in the power leads of the motor thereof, not shown, or by means of provision of an adjustable by-pass valve, also not shown), whereby a controlled rate of humidification can be realized during operation of the heat exchanger unit 240, and whereby the rate of water flushing of the air filter can be regulated to suit the preferences of the operator.

The invention has been illustrated and described in elaborate detail, perhaps considerably more than is necessary in order to assure a full and complete understanding of the principles thereof, as has been the objective, and no narrowness of scope of invention is to be implied therefrom. Quite obviously, the illustrated embodiment of the invention is subject to numerous modifications and variations without departing from the spirit of the invention, and accordingly, attention is directed to the appended claims in order to ascertain the actual scope of the invention.

I claim:

1. In the combination of a vehicle operator's cab and an evaporative air conditioner system therefor that includes a housing externally mounted on the top of the cab with such housing including air inlet means provided with a water wettable air filter therein and enclosing an air impelling means for drawing ambient air into the housing through the air filter and exhausting filtered air through an outlet communicating with the interior of the cab through the top of the latter; the improvement comprising a water circulation means for continuously wetting and washing the air filter with water, said water circulation means comprising a water supply tank positioned at a height substantially lower than the housing, a first conduit means including a first conduit provided with a pump therein for forcing delivery of water from the tank onto the top of the air filter, a second conduit means communicating with the interior of the housing for returning water draining from the air filter by gravitational flow to the tank, said housing being generally rectangular and including a rectangular bottom portion having a bottom wall and an upstanding fixed first end wall at one end thereof constituting a first end wall of the housing, and a top portion above and pivotally connected to the bottom portion, said top portion including a rectangular top wall spaced above the bottom wall and having depending walls at its opposite sides and at one end thereof, said depending walls of the top portion constituting in part side walls of the housing and the depending wall at one end of the top portion constituting in part a second end wall of the housing that is disposed at the end of the latter opposite the first end wall, said depending walls of the housing top portion having openings therethrough constituting said air inlet means, said air filter being generally U-shaped and including upstanding opposite side portions and an upstanding end portion extending therebetween, said air filter being within the housing and carried by the bottom portion of the housing with the end portion thereof being closely juxtaposed to the second end wall of the housing and the side portions thereof being closely juxtaposed to the depending side walls of the housing top portion, said bottom wall of the bottom portion of the housing having an upstanding second end and side walls respectively constituting in part said second end wall and said side walls of the housing, said top portion of the housing being pivotally movable about a horizontal axis between a horizontal position of use and a raised position affording access to the interior of the housing, said axis being parallel to and adjacent the second end wall of the housing, and said top and bottom portions of the housing being in substantial sealing relationship with each other along the lower edges of the depending walls and along the top and lateral edges of the first end wall of the housing, when the top portion is in its position of use.

2. The combination of Claim 1, wherein the top portion of the housing has a center of gravity that moves horizontally from one side to the other of the axis when pivotally swung between its lowered position of use to its raised position.

3. The combination of Claim 2, wherein the bottom portion of the housing includes structure disposed in the travel path of the top portion of the housing limiting pivotal movement of the latter.

4. The combination of Claim 2, wherein the top of the cab includes structure disposed in the travel path of the top portion of the housing limiting pivotal movement of the latter.

5. The combination of Claim 3, wherein the top portion of the housing projects horizontally to one side of the axis in a direction from the first end wall of the housing to limit pivotal movement to an angle of about 90 to about 135 degrees.

6. The combination of Claim 5, wherein the upstanding second end and side walls of the bottom portion of the housing are provided with means for removably receiving and supporting lower edges of the air filter, said top wall of the top portion of the housing engaging upper edges of the air filter and preventing removal of the air filter when the top portion of the housing is in its lowered position of use.

7. The combination of Claim 6, wherein the second end wall of the bottom portion of the housing is of lesser height than the first end wall of the bottom portion of the housing, said side walls of the bottom portion of the housing being of substantially the same height as the second end wall thereof at their junctures therewith and being of progressively decreasing height along their extents to their junctures with the first end wall of the bottom portion of the housing, said means for removably receiving the lower edges of the filter being comprised of troughs extending along the upper margins of the second end and side walls of the bottom portion of the housing, and said troughs being provided with a plurality of drain openings therethrough.

8. In air conditioning apparatus, a horizontal, generally rectangular housing including top and bottom walls together with first and second end walls and opposite side walls, said housing having horizontal dimensions substantially greater than the height thereof such as to be of low profile, said second end wall and the side walls having openings therein spaced above the bottom wall to constitute air inlet means and to constitute of the lowermost interior of the housing a water collecting chamber, an upstanding U-shaped filter structure carried by the second end wall and the side walls above the bottom wall and at said openings for filtering air entering the housing through said air inlet means, said first end wall being provided with a drain port adjacent the bottom wall whereby water collecting in the water collecting chamber may be returned to a source of water, said first end wall being provided with a water inlet port adapted to receive water from a pressurized source thereof, conduit means within the housing and connected to the water inlet port for distributing water received through water inlet port over the filter, said bottom wall of the housing having an opening therethrough, means within the housing for forcing air within the upper portion of the interior of the housing downwardly through the opening in the bottom wall, and means within the housing for preventing water within the water collecting chamber from entering the opening in the bottom wall.